Patented Mar. 3, 1942

2,274,782

UNITED STATES PATENT OFFICE 2,274,782

LIGHT-SENSITIVE PHOTOGRAPHIC MATERIAL

Béla Gáspár, Hollywood, Calif., assignor to Chromogen, Incorporated, a corporation of Nevada No Drawing. Application November 16, 1938, Serial No. 240,860. In Great Britain November 24, 1937

14 Claims. (Cl. 95—2)

The present invention relates to easily destructible dyes which are useful for coloring photographic filter layers or antihalation layers. For this purpose dyestuffs are necessary which can be bleached out easily by treating solutions which have no detrimental effect on the photographic layer, the latent image or the developed silver image or on image forming dyestuffs or dyestuff forming substances which might be present in the photographic material. It has been found that filter layers or antihalation layers can be produced by means of dyestuffs derived from cyclic compounds which are linked together by a methine group or a polymethine chain according to the following formula:

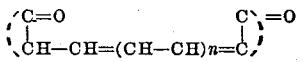

wherein $n$ may be equal to zero or represents 1, 2, 3, ... (the limiting value of $n$ probably being 4 or 5, although it may possibly be higher) and wherein

represents a cyclic system with a carbonyl group neighbouring the carbon atom linked to the methine or polymethine chain. Cyclic systems of this kind are, for instance, pyrazolone, isoxazolone, barbituric acid, thio-barbituric acid and their substitution products. Dyestuffs of the above formula in which the H-atoms may be replaced by hydrocarbon groups, can be produced in different colors which have sharp absorption spectra. Filter or antihalation layers colored by them can be decolorized in the photographic treatment baths especially in the alkaline developer or in solutions containing sulphite or bisulphite.

The following examples will illustrate the invention:

Example 1.—1 grm. of the dyestuff 4,4'-methenyl-bis-(1-phenyl-3-methyl-pyrazolone-5) is dissolved in 30 ccs. of warm alcohol with the addition of 10 ccs. diethanolamine and mixed with an aqueous gelatin solution containing 15 grms. gelatin in 200 grms. water. The yellow colored gelatin solution is poured on a silver halide emulsion layer of about 1 sq. m. surface. The yellow filter layer thus obtained is decolorised during the development of the exposed light-sensitive material by an alkaline developer containing sodium bisulfite.

The dyestuff used in this example is obtained in a known manner as described in Beilstein, Handbuch der organischen Chemie, 1937, 4th edition, vol. XXVI, page 496. The dyestuff 4,4'-methenyl-bis-(3-methyl-pyrazolone-5), see Beilstein l. c. page 495, may be used. Another dyestuff which can be used and which is believed to be 4,4'-methenyl-bis-(1-naphtyl-3-methyl-pyrazolone-5) of the following formula

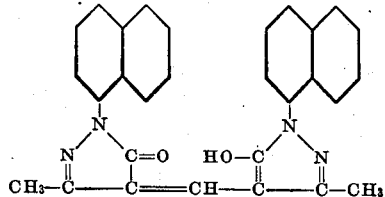

is prepared by condensing the 1(α-naphtyl)-3-methyl-pyrazolone with orthoformic ester in the following manner: 4.5 grms. of 1(α-naphtyl)-3-methyl-pyrazolone, 1.7 cc. ethyl orthoformate, 40 cc. acetic acid anhydride are boiled for about 5 hours, then cooled and mixed with about 100 cc. diethylether. The dyestuff is precipitated, washed with ether and dried. The yellow dyestuff thus obtained is used for coloring gelatin solutions as described above.

The 1-(α-naphtyl) - 3 - methyl - pyrazolone-5, necessary for the reaction is obtained as follows: 1 mol α-naphtyl hydrazine (Berichte der Deutschen Chemischen Gesellschaft vol. 19, 1886, referates page 303) is refluxed for about 1½ hours with 1 mol ethyl aceto-acetate. Thereafter the solution is made alkaline by the addition of sodium hydroxide solution of 30% strength and again heated for about half an hour on a waterbath. After several hours the solution is filtered and concentrated acetic acid is added. The precipitate is filtered off, washed with water and recrystallised from 50% ethyl alcohol. Melting point 165°.

Instead of the dyestuffs used in the preceding example dyestuffs may be used which contain a sulfonic or carboxylic group and which are more easily soluble in water and can be used in aqueous solution.

Example 2.—1-2 grms. of the dyestuff 4,4'-methenyl-bis-(1-(p-sulfo-phenyl)-3-methyl-pyrazolone-5) are dissolved in water and added to an aqueous gelatin solution. Filter layers are produced from the yellow colored gelatin solution as described in Example 1.

Instead of the sulfonated dyestuff the dyestuff 4,4' - methenyl - bis - (1 - (p - carboxyphenyl)-3-methyl-pyrazolone-5) may be used. Both dyestuffs can be precipitated by triphenyl-guanidineacetate or another suitable precipitating agent within the gelatin in order to prevent a wandering of the filter dyestuff.

4,4'-methenyl-bis-(1-(p-sulfophenyl)-3-methyl-pyrazolone-5) is obtained from 1-(p-sulfophenyl)-3-methyl-pyrazolone-5 by condensation with ethyl orthoformate, the condensation being brought about in pyridine or acetic anhydride.

4,4' - methenyl - bis - (1 - (p - carboxyphenyl) - 3 - methyl-pyrazolone-5) is obtained in an analogous manner from 1-(p-carboxyphenyl)-3-methyl-pyrazolone-5.

*Example 3.*—1–2 grms. of the red dyestuff obtained from 1-(p-sulfophenyl)-3-methyl-pyrazolone-5 and β-anilino-acrolein-anil are dissolved in water and incorporated in a gelatin solution as described in connection with Example 1. The filter layer shows a sharp absorption for green light. For the production of a filter layer which is to absorb blue light and green light the quantity of the dyestuff is increased to about 3–6 grms. per sq. m.

The dyestuff is produced by condensation of 2 mols 1-(p-sulfophenyl)-3-methyl-pyrazolone-5 with β-anilino-acrolein-anil in methyl-alcoholic solution with the addition of 3 mols triethylamine. The mixture is heated for about 3 hours to its boiling point. Thereafter a concentrated solution of potassium acetate in methyl alcohol is added.

The dyestuff produced probably has the formula:

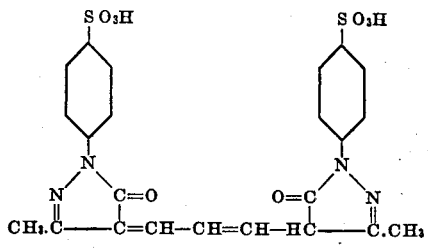

or it may have a tautomeric form such, for example, as

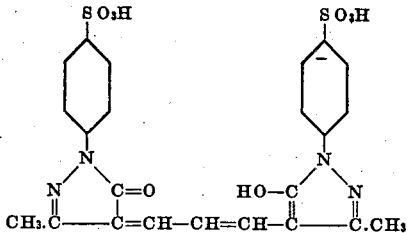

*Example 4.*—0.8 grm. of the blue-green dyestuff obtained by the condensation of 1-(p-sulfophenyl)-3-methyl-pyrazolone-5 and glutacon-dialdehyde-dianilide are used for coloring a filter layer of 1 sq. m. surface. This layer only absorbs the red light, but if about 4 grms. of the dyestuff are used almost all of the visible light is absorbed. Such a layer may be used as an antihalation layer behind a sensitive silver halide emulsion.

The dyestuff is obtained by condensation in methyl-alcoholic solution of 2 mols 1-(p-sulfophenyl)-3-methyl-pyrazolone-5 and 1 mol glutacon-dialdehyde-dianilide with the addition of 2 mols triethylamine as described in the preceding example.

The dyestuff produced probably has the formula:

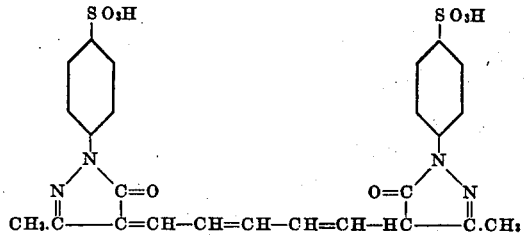

or one or more of the tautomeric forms as explained in Example 3.

*Example 5.*—0.6 grms. of the blue condensation product obtained from thio-barbituric acid and glutacon-dialdehyde-dianilide are dissolved in 50 grms. water and added to an aqueous gelatin solution containing 7 grms. gelatin in 100 grms. water, the gelatin is coated on 0.5 sq. m. of silver halide emulsion.

The dyestuff is obtained in the following manner: 0.75 grms. thio-barbituric acid are dissolved in 35 ccs. pyridine and 75 grms. glutacon-dialdehyde-dianilide are added. The mixture is kept for about 2 days at a temperature of ca. 80° C.; from the blue colored solution the pyridine is removed in vacuo. The remaining dyestuff is soluble in water and may be salted out by sodium chloride.

The dyestuff produced has the probable formula:

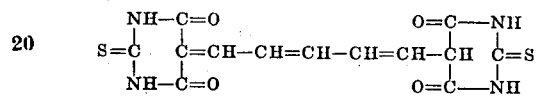

In an analogous manner dyestuffs can be obtained from 2 mols phenyl-isoxazolone and 1 mol glutacon-dialdehyde-dianilide. In this case a reddish-blue dyestuff is obtained if the mixture is heated to about 80° C. for about four hours whereas a blue-green dyestuff is obtained if the mixture is kept at room-temperature for about 2 days. Both dyestuffs are soluble in water and can be salted out by sodium chloride with the addition of a small amount of acetic acid. They are incorporated into photographic layers in the manner described above.

Instead of producing the filter dyestuffs from 1-phenyl-3-methyl-pyrazolone-5 or from 1-naphthyl-3-methyl-pyrazolone-5, as described in connection with Example 1, similar filter dyestuffs may be produced from pyrazolones substituted by radicals such as diphenyl, quinoline, thiazole or other isocyclic or heterocyclic radicals. The production of the dyestuff may be carried out as described in connection with the preparation of the dyestuff from the naphtyl-pyrazolone. Thus, for example, it is possible to start from amino-dehydro-thio-toluidine, to transform this compound into a hydrazine and to prepare a pyrazolone in which the pyrazolone nucleus is substituted by a benz-thiazole radical. This pyrazolone can be transformed into a methine or polymethine dye which may be used as a filter dye.

It is further possible to start from diamino compounds such as phenylene-diamine, benzidine, naphtylene-diamine and to transform them into pyrazolones, which are further transformed into filter dyestuffs. For example, (diphenylen-(4,4'))-di-hydrazine, see Beilstein l. c., vol. XV, page 585, is treated with aceto-acetic ester in the known manner and the pyrazolone is obtained from which a dyestuff may be produced by condensation with ethyl-orthoformate, glutacon-dialdehyde-dianilide or the like.

Instead of forming the filter dyes by condensation of the cyclic component with ortho-formic ester I can also use derivatives of ortho-formic ester such as diphenyl-formamidine. The condensation may also be performed by homologues of the ortho-formic ester or by chloroform and alkali in alcoholic solution or by formic acid. For example, 2 mols of 1-phenyl-3-methyl-5-pyrazolone are refluxed for several hours with 1 mol ethyl ortho-acetate in acetic anhydride. Thereafter the dyestuff formed is precipitated by the addition of ether, filtered off and washed with water. It is recrystallised by dissolving in a small amount of hot methanol, cooling by icewater and adding ether. The dyestuff has a melting point of 174° C. and is of yellow-orange color.

Instead of β-anilino-acrolein-anil also the acetale may be used and instead of the acrolein or glutacon compounds the higher homologues may be used. In general the condensation products obtained from the pyrazolone and anilino-acrolein-anil are purple-red dyestuffs whereas the condensation with derivatives of glutaconic acid results in dyestuffs of blue or blue-green color.

The dyestuffs can also be incorporated into light sensitive layers as well as in separate gelatin layers above, below or between light sensitive layers.

The production of colored gelatin solutions which can be used for the production of a yellow filter layer can be described in a more detailed fashion and by way of an example as follows: 300 cc. of a 3% aqueous solution of the dyestuff 4,4'-methenyl-bis(1-(p-sulphophenyl)-3-methyl-pyrazolone-5), referred to in Example 2, are mixed with 20 cc. of a 2-normal sodium acetate solution and this mixture is added to 100 cc. of an aqueous gelatin solution containing 20% gelatin. Thereafter 100 cc. of a 2% solution of Invadine N (see Schultz Farbstofftabellen, 7th edition, volume II, page 316) are added to the colored gelatin solution. 140 cc. of an aqueous solution containing 10% of the acetate of the dibiguanide derived from p,p'-diamino-diphenylmethane are added and the total volume of the gelatin solution is diluted to 1000 cc. by the addition of water. This solution will be refered to as the yellow colored gelatin solution.

The dibiguanide derived from diamino-diphenylmethane is prepared by the reaction of dicyandiamide with p,p'-diamino-diphenylmethane hydrochloride, and the acetate is prepared by dissolving the free base in acetic acid.

For the preparation of a gelatin solution suitable for the production of a red filter layer 100 cc. of a 3.6% aqueous solution of the dyestuff prepared according to Example 3 are mixed with 100 cc. of a 20% aqueous gelatin solution. 75 cc. of an aqueous solution containing 10% of the acetate of the dibiguanide derived from benzidine are added and the mixture is diluted to a total volume of 1000 cc. by addition of water. This solution will be referred to as the red colored gelatin solution.

The dibiguanide derived from benzidine is prepared by condensing dicyandiamide with benzidine hydrochloride and the acetate is prepared by dissolving the free base in acetic acid.

The yellow colored gelatin solution and the red colored gelatin solution may be used for the production of filter layers in light sensitive multilayer materials.

For example a transparent support carrying an ordinary blue-sensitive silver halide emulsion layer is coated with a layer of the yellow colored gelatin, 100 cc. yellow colored gelatin solution being coated on a surface of 1 sq. m. The film can be used as the front element of a bipack or tripack in which case the yellow filter layer is arranged adjacent to the second light sensitive element of the pack.

Or, alternatively, the film with the blue-sensitive layer and the yellow filter layer coated thereon may be used for the production of a multilayer light sensitive element. In this case an ortho-chromatic light sensitive silver halide emulsion is coated on top of the yellow filter layer and the double-coated film with the intermediate yellow filter layer may be used as the front element of a bipack in combination with a rear film carrying a red sensitive emulsion. This rear film carries a panchromatic emulsion coated on a transparent support and a red filter layer is coated on the panchromatic emulsion. For the formation of this red filter layer the red colored gelatin solution may be used, 100 cc. of which are coated on a surface of 1 sq. m. The front element and the rear film are combined with the orthochromatic layer of the front element in contact wtih the red filter layer. Alternatively, the red filter layer may be coated over the orthochromatic layer of the front film, the rear film in this case being an ordinary panchromatic film.

It is also possible to use one or more filter layers of the present invention in a multilayer material having three light sensitive layers on a single support. The structure of such a film is, for example, as follows: an ordinary blue-sensitive front emulsion, a yellow filter layer formed by 100 cc. of the yellow colored gelatin solution per sq. m., an orthochromatic emulsion, a red filter layer formed by 100 cc. of the red colored gelatin solution per sq. m. and a panchromatic emulsion, the carrier being arranged in front of the assembled layers, or between two of the layers or on the back of the assembled film in which latter case even an opaque support may be used.

The light sensitive layers are exposed and developed with an alkaline developer for example one containing 6 grms. hydroquinone, 1.5 grms. metol, 40 grms. sodium carbonate, 25 grms. sodium sulphite and 1 grm. potassium bromide per liter, which acts to form metallic silver images in the different silver halide layers and simultaneously destroys the filter dyestuff. From the silver images, dyestuff images may be produced in any known manner. Dyestuff forming substances for the production of dyestuff images may be present in one or more of the light sensitive layers. Thus, for example, in the case of a film in which one light sensitive layer is coated on the one side and the two other light sensitive layers are coated on to the opposite side of the support with the filter layers lying between them, as described above, the light sensitive layer which is situated on the double coated side and which is covered by a filter layer and the other light sensitive layer may contain 1 grm. per sq. m. of the carbonyl-bis-(8-(4-(4-aminobenzamino)benzamino)-naphthol-(1)-disulfonic acid-(3.6))-see Beilsteins Handbook 4th edition, supplement, vol XIV, page 759 and page 758, formula XI. This compound is precipitated within the layer by the addition of 1 grm. triphenyl guanidine acetate per sq. m. and is transformed into a dyestuff after exposure by treating the developed film with a diazo-solution. The two surface layers can be transformed separately into dyed layers or dyestuff images by any desired toning, mordanting or other coloring process. All of the light sensitive layers of the multilayer material may contain dyestuff forming substances for example leuco-esters of vat dyes or the components of azo-dyestuffs or the components of dyestuffs obtainable by the process of colored development.

What I claim is:

1. A light sensitive photographic material comprising a filter dye of the general formula

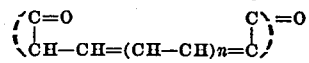

wherein the hydrogen atoms of the open chain may be replaced by hydrocarbon residues, $n$ having a value between zero and 3, inclusively, and

representing a cyclic radical having a carbonyl group neighbouring the ring carbon atom which is linked to the carbon atom of the open chain, the filter dye being present in such an amount that with respect to colored light for which said filter dye has its predominant absorption the optical density of the material is greater than 1.

2. A light sensitive photographic material comprising a filter dye of the general formula

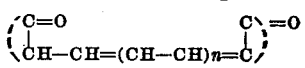

wherein the hydrogen atoms of the open chain may be replaced by hydrocarbon residues, $n$ having a value between zero and 3, inclusively, and

representing a cyclic radical having a carbonyl group neighbouring the ring carbon atom which is linked to the carbon atom of the open chain, the said cyclic radical carrying an acid salt forming substituent, the filter dye being present in such an amount that with respect to colored light for which said filter dye has its predominant absorption the optical density of the material is greater than 1.

3. A light sensitive photographic material comprising a filter dye of the general formula

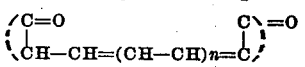

wherein the hydrogen atoms of the open chain may be replaced by hydrocarbon residues, $n$ having a value between zero and 3, and

representing a pyrazolone radical.

4. A light sensitive photographic material comprising a filter dye of the general formula

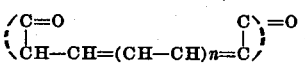

wherein the hydrogen atoms of the open chain may be replaced by hydrocarbon residues, $n$ having a value between zero and 3, inclusively, and

representing a sulfonated pyrazolone radical.

5. A light sensitive photographic material comprising a filter dye of the general formula

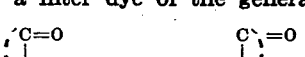

wherein the hydrogen atoms of the open chain may be replaced by hydrocarbon residues, $n$ having a value between zero and 3, inclusively, and

representing a carboxylated pyrazolone radical.

6. A light sensitive photographic material comprising within a silver halide emulsion layer a filter dye of the general formula

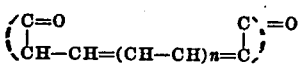

wherein the hydrogen atoms of the open chain may be replaced by hydrocarbon residues, $n$ having a value between zero and 3, inclusively, and

representing a cyclic radical having a carbonyl group neighbouring the ring carbon atom which is linked to the carbon atom of the open chain, the filter dye being present in such an amount that with respect to colored light for which said filter dye has its predominant absorption the optical density of the material is greater than 1.

7. A light sensitive photographic material comprising at least one silver halide emulsion layer and at least one filter layer, the filter layer comprising a dye of the general formula

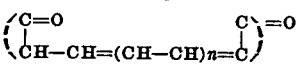

wherein the hydrogen atoms of the open chain may be replaced by hydrocarbon residues, $n$ having a value between zero and 3, inclusively, and

representing a cyclic radical having a carbonyl group neighbouring the ring carbon atom which is linked to the carbon atom of the open chain, the filter dye being present in such an amount that with respect to colored light for which said filter dye has its predominant absorption the optical density of the material is greater than 1.

8. A light sensitive photographic material comprising a yellow filter dye of the general formula

wherein the hydrogen atoms of the open chain may be replaced by hydrocarbon residues, $n$ having a value between zero and 3, inclusively, and

representing a cyclic radical having a carbonyl group neighbouring the ring carbon atom of the open chain, the filter dye being present in such an amount that with respect to colored light for which said filter dye has its predominant absorption the optical density of the material is greater than 1.

9. A light sensitive photographic material comprising a red filter dye of the general formula

wherein the hydrogen atoms of the open chain may be replaced by hydrocarbon residues, $n$ having a value between zero and 3, inclusively, and

representing a cyclic radical having a carbonyl group neighbouring the ring carbon atom which is linked to the carbon atom of the open chain, the filter dye being present in such an amount that with respect to colored light for which said filter dye has its predominant absorption the optical density of the material is greater than 1.

10. A light sensitive photographic multilayer material with a dyestuff forming substance in at least one of the light sensitive layers, the material comprising a filter dye of the general formula

wherein the hydrogen atoms of the open chain may be replaced by hydrocarbon residues, $n$ having a value between zero and 3, inclusively, and

representing a cyclic radical having a carbonyl group neighbouring the ring carbon atom which is linked to the carbon atom of the open chain, the filter dye being present in such an amount that with respect to colored light for which said filter dye has its predominant absorption the optical density of the material is greater than 1.

11. A light sensitive photographic material comprising a silver halide emulsion layer sensitised to green light and a yellow filter dye of the general formula

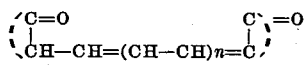

wherein the hydrogen atoms of the open chain may be replaced by hydrocarbon residues, $n$ having a value between zero and 3, inclusively, and

representing a cyclic radical having a carbonyl group neighbouring the ring carbon atom which is linked to the carbon atom of the open chain, the filter dye being present in such an amount that with respect to colored light for which said filter dye has its predominant absorption the optical density of the material is greater than 1.

12. A light sensitive photographic material comprising a silver halide emulsion layer sensitized to red light and a red filter dyestuff of the general formula

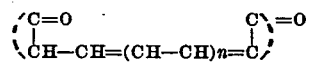

wherein the hydrogen atoms of the open chain may be replaced by hydrocarbon residues, $n$ having a value between zero and 3, inclusively, and

representing a cyclic radical having a carbonyl group neighbouring the ring carbon atom which is linked to the carbon atom of the open chain, the filter dye being present in such an amount that with respect to colored light for which said filter dye has its predominant absorption the optical density of the material is greater than 1.

13. A light sensitive photographic material comprising at least two silver halide emulsion layers, a sensitizer within at least one of said layers and an intermediate filter layer between the layers, the filter layer comprising a dye being destroyable by photographic developers of alkaline reaction and having the following general formula

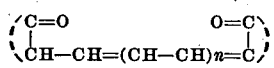

wherein the hydrogen atoms of the open chain may be replaced by hydrocarbon residues, $n$ represents a value between zero and 3, and

represents a cyclic radical having a carbonyl group neighbouring the ring carbon atom which is linked to the carbon atom of the open chain.

14. A light sensitive photographic material having a plurality of colloid layers arranged on a common support, two at least of the layers being silver halide emulsion layers, one of the silver halide layers comprising a sensitizing dye and one layer of the photographic material comprising a filter dye being destroyable by photographic developers of alkaline reaction and having the following general formula

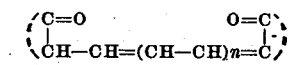

wherein the hydrogen atoms of the open chain may be replaced by hydrocarbon residues, $n$ represents a value between zero and 3, and

represents a cyclic radical having a carbonyl group neighbouring the ring carbon atom which is linked to the carbon atom of the open chain.

BÉLA GÁSPÁR.